Feb. 27, 1962 W. O. BECHMAN 3,022,836
LAND CLEARING IMPLEMENT
Filed Sept. 30, 1959 2 Sheets-Sheet 1
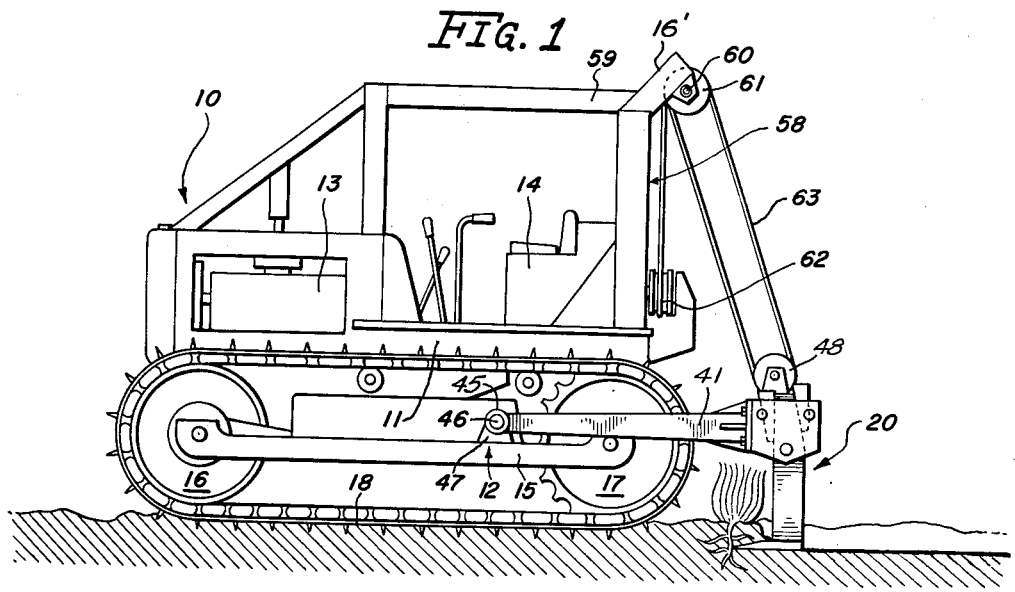
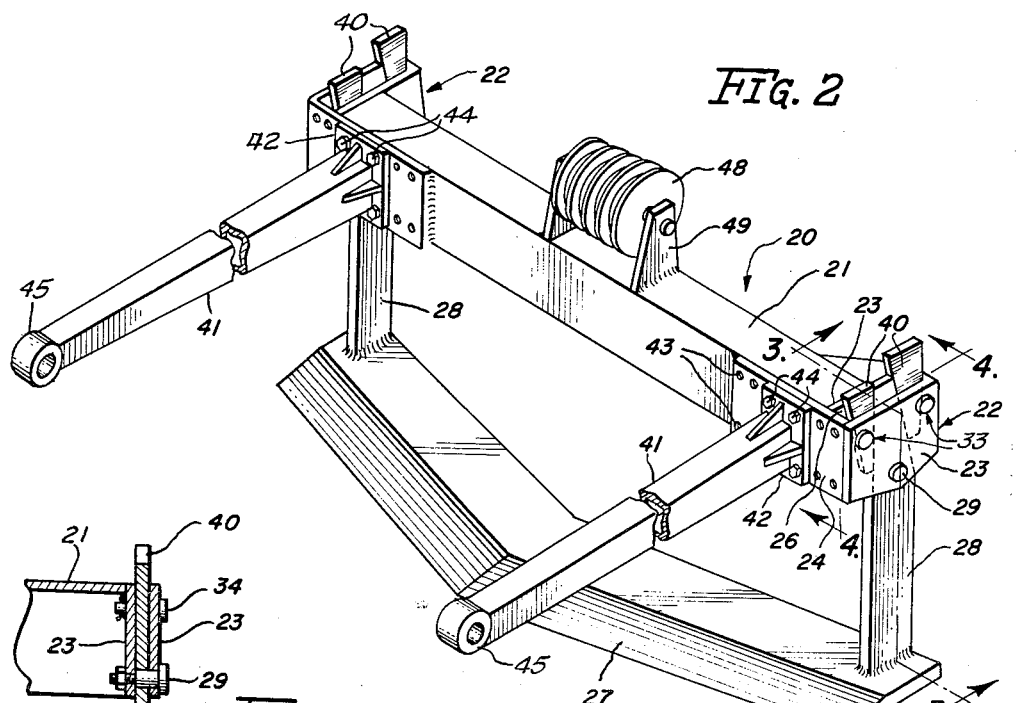
INVENTOR
William O. Bechman
ATTORNEY Feb. 27, 1962 W. O. BECHMAN 3,022,836
LAND CLEARING IMPLEMENT
Filed Sept. 30, 1959 2 Sheets-Sheet 2
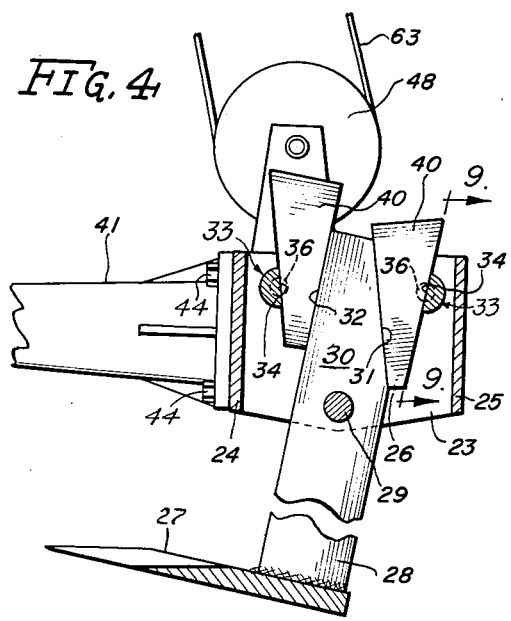
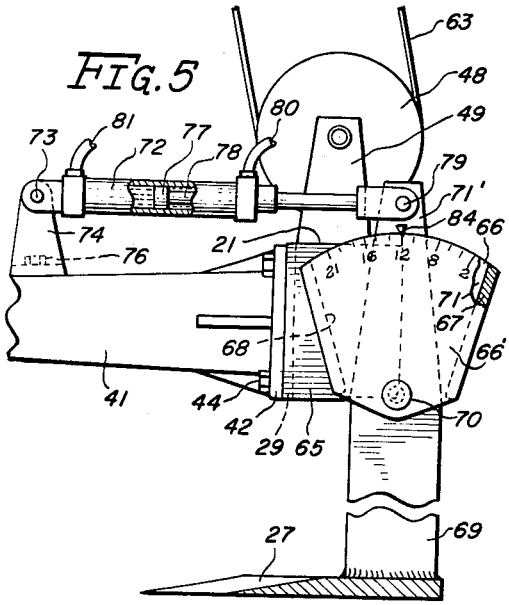
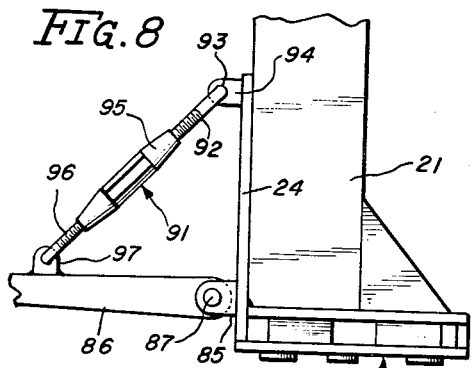
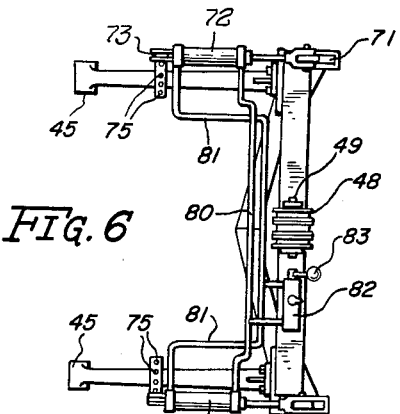
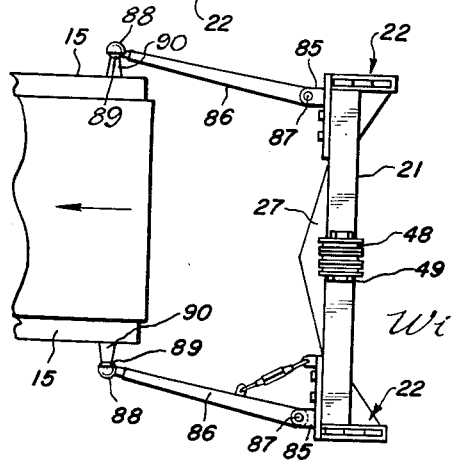
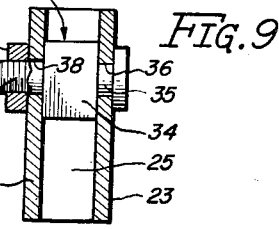
INVENTOR
William O. Bechman
ATTORNEY

United States Patent Office 3,022,836
Patented Feb. 27, 1962

3,022,836
LAND CLEARING IMPLEMENT
William O. Bechman, Chicago, Ill., assignor to International Harvester Company, Chicago, Ill., a corporation of New Jersey
Filed Sept. 30, 1959, Ser. No. 843,433
4 Claims. (Cl. 172—698)

This invention relates to an implement and particularly to an implement of a type commonly known as a root plow.

In certain areas the land may be infested with undesirable vegetation having deep root growth. In such areas an implement known as a root plow has been successful in penetrating the soil to a desired depth, the implement then being effective to sever the roots of the undesirable vegetation and to leave the land so that it is more acceptable for use. The conventional root plow generally comprises a frame consisting of a transverse beam having forwardly extending draft arms connected thereto. The transverse beam is provided with supporting structures which serve to support the vertical arms leading to a root plow proper disposed beneath the transverse member. The draft arms generally are pivotally connected to a crawler tractor so the structure of the transverse beam and root plow may be raised and lowered. In addition the root plow generally comprises a V-shaped type of cutting blade that during operation is disposed beneath the ground and serves to cut the roots of the vegetation which are encountered. The root plow blade is pivotally connected to the transverse structure by suitable arms and thus the arms may be moved to a number of angled positions relative to the ground and secured in these various positions by means of a suitable locking arrangement. It is a prime object of this invention therefore to provide an improved land clearing implement having a novel construction for locking the root plow in a number of angled positions.

A still further object is to provide an improved root plow including a plow blade adapted to be positioned in ground-engaging relation in a number of positions, the said improvement including a simplified and positive wedging construction associated with arms of the plow blade for rigidly, positively, and quickly permitting the adjustment of the arms and plow blade in a number of different positions.

A still further object is the provision of an improved root plow having a simplified and novel construction whereby the plow may be shifted in a disassembled condition to its point of destination and can be quickly assembled upon reaching the same.

A still further object is the provision of an improved root plow including a transverse member and a pair of draft arms, the said draft arms being adjustably connected to the transverse member so that the plow and associated structure may be positioned in off-center relation relative to the longitudinal center line of a tractor with which the root plow is utilized.

A still further object is the provision of an improved root plow arrangement including a plow blade adapted to be positioned in a number of angled positions relative to the ground, said plow blade including vertical arms adapted to be pivotally connected to a transverse member of the plow, the said root plow including hydraulic jacks adapted to pivot the vertical arms and the plow blade.

A still further object is the provision of an improved land clearing implement of the root plow type, the said implement including a simplified novel arrangement of draft arms and a transverse means including an adjustable member adapted upon adjustment to move the root plow and transverse member to an offset position relative to the longitudinal center line of a tractor to which it may be connected.

These and other objects will become more readily apparent from a reading of the specification when examined in connection with the accompanying sheets of drawings.

In the drawings:

FIGURE 1 is a side elevational view of an improved root plow or land clearing implement connected to a crawler type tractor;

FIGURE 2 is an enlarged perspective view of an improved root plow;

FIGURE 3 is a cross sectional view taken substantially along the line 3—3 of FIGURE 2;

FIGURE 4 is an enlarged cross sectional view taken substantially along the line 4—4 of FIGURE 2;

FIGURE 5 is a side elevational view of a modified root plow construction showing a hydraulic adjusting means for the root plow blade;

FIGURE 6 is a plan view of a modified root plow showing hydraulic adjusting means for placing the root plow blade in a number of angular positions relative to the ground;

FIGURE 7 is a plan view of another modified type of root plow showing an improvement for positioning the said plow in offset relation with respect to the center line of a tractor;

FIGURE 8 is an enlarged detail view of a portion of the root plow arrangement shown in FIGURE 7 showing an enlargement of an adjusting element for regulating the offset position of the root plow; and FIGURE 9 is a cross sectional view taken substantially along the line 9—9 of FIGURE 4.

Referring now particularly to FIGURE 1, a crawler type tractor is generally designated by the reference character 10. The crawler tractor 10 comprises a main frame 11 having on opposite sides thereof track frames 12, only one of which is shown. A main frame supports an engine 13 and an operator's station 14. Each track frame 12 comprises a longitudinally extending frame member 15 including sprockets 16 and 17 around which an endless track 18 is suitably disposed.

FIGURES 1 and 2 disclose a land clearing implement generally designated 20, the said implement being of a type commonly referred to as a root plow. The implement 20 comprises a transverse box type beam 21 having at its opposite ends a pair of supporting structures generally designated at 22. Each supporting structure 22 comprises vertically extending and laterally spaced plates 23 suitably connected to a forward plate 24 and a rear plate 25. The plates 23 may be secured to the plates 24 and 25 by welding securing means providing the desired strength. As shown in FIGURES 2 and 4, the plates 23, 24 and 25 are so positioned as to provide a pair of vertically extending slots 26 in each of the structures 22, the said slot 26 being open at their upper and lower ends. A V-shaped root plow blade is designated at 27 and includes a pair of transversely spaced upright legs 28 which are suitably pivoted as indicated at 29 or the spaced plates 23. The pivot 29 may be constructed of a suitable pin or pivot member firmly secured to the blade plates 23. As best shown in FIGURE 4 the legs 28 also include an upper portion 30 having on one side a tapered edge 31 and on an opposite side a straight edge 32. The portion 30 is adapted to move between a pair of cylindrical pins or rollers 33 having, as best shown in FIGURES 4 and 9, a flat face 34 positioned between the plates 23. The rollers 33 each include a pivot portion 35 journalled in an opening 36 in one of the plates 23. The rollers further include a pivot portion 37 disposed in an opening 38 of the other of the plates 23 and a nut 39 is suitably threaded to the member 37. As best shown in FIGURE 4 wedges 40 cooperate with the flat faces 34 and the edges 31 and 32 to maintain each leg 28 in the desired position.

Referring now particularly to FIGURES 1 and 2 the implement 20 includes draft arms 41 substantially parallel and extending from the box beam 21 in lateral relation. Each draft arm 41 is provided at one end with a bracket 42. The transverse plates 24 are provided with a plurality of tapped or threaded holes 43 and bolts 44 extending through the brackets 42 engage the holes 43 to securely position each draft arm 41 on the box beam 21. It can be seen that the beams 41 may be moved along the box beam 21 to a plurality of positions so that the blade 27 may be positioned off center with respect to a longitudinal center line of a tractor to which the implement may be attached. Also the draft arms 41 may be quickly disconnected for shipment purposes of the implement structure and may be quickly assembled in the field.

The draft arms 41 also include pivot ends 45 which by means of suitable pivot pins 46 are connected to brackets 47 in turn suitably connected to the frame members 15 of the crawler tractor 10.

Referring particularly to FIGURES 1 and 2 a plurality of sheaves 48 are suitably carried by brackets 49 in turn connected to the box beam 21. The crawler tractor 10 is provided with a superstructure generally designated at 58 which is suitably supported on the crawler 10 and includes a frame 59 having a suitable bracket structure 16 on which a plurality of sheaves 61 are journalled. A cable control unit is generally designated at 62 the said unit being operative to reel and unreel a cable generally designated at 63 which is trained around the sheaves 61 and 48.

A modified embodiment of the invention is shown in FIGURES 5 and 6. In this modification the draft arms 41 and connecting brackets 42, including the root plow blade 27, are of the same construction as previously indicated. Also the box beam 21 is provided, which suitably supports brackets 49 and sheaves 48 in turn engaged by the cable 63. In this particular modification the ends of the box beam 21 suitably support vertical plate 65 which in turn has rigidly welded thereto sector shaped plates 66. Another sector shaped plate 66' is suitably connected to the first sector shaped plate 66 by means of end plates 67 and 68. A pair of upright legs 69 are suitably connected to the blade 27, the legs extending upwardly and being pivoted on the sector shaped plates 66' by means of a pivot 70. The legs extend upwardly into a slot 71 formed by the plates 66, 66', 67 and 68, the said leg 69 including upper portions designated at 71'. Thus it is apparent that the leg 69 may pivot in the slot 71.

As best shown in FIGURE 6 a pair of jacks or fluid cylinders 72 are positioned on the draft arms 41. Each fluid cylinder 72 comprises, or is connected as indicated at 73, to a bracket 74, the said bracket 74 having a plurality of laterally spaced openings 75 as best shown in FIGURE 6. A securing means in the form of a screw 76 extends through one of the openings 75 for suitably connecting the bracket 74 to the draft arm 41. The bracket 75 may be laterally adjusted by means of the openings 75.

Each fluid cylinder 72 includes a piston 77 suitably connected to a ram 78 the end of which is pivotally connected by means of a pin 79 to the upper portion 71 of the leg 69. Upon reciprocation of the piston 77 the leg 69 and plow blades 27 are angled or tilted to various positions with respect to the ground. Actuation of the piston 77 is provided by means of conduits 80 and 81 which communicate with a hand pump and reservoir arrangement 82 which is actuated by a suitable manual control member 83. The pump and reservoir 82 is not described in detail since it may be a suitable hand pump and reservoir, which will, upon suitable actuation of internal valving, direct fluid under pressure to either of the lines 80 and 81 for reciprocating the piston 77. As indicated in FIGURE 5 the upper portion 71 of each of the arms 69 may also include an indicator projection 84 which is adapted to be placed in registry with suitable indices located on the plate member 66' to indicate the proper depth adjustment in inches which is accomplished by the tilting movement afforded by the jack 72.

Referring now particularly to FIGURES 7 and 8 another modified form of the invention is disclosed. In this connection the transverse beam 21 is provided with the supporting structures 22, the root plow blade 27 and other structure previously described. Furthermore, the beam 21 supports at opposite ends brackets 85 which support draft arms 86. The draft arms 86 are suitably pivoted about vertical axes by means of pivot members 87. The draft arms 86 also are provided at their forward ends with sockets 88 which engage balls 89 in turn supported by means of brackets 90 on the frame members 15 of the tractor 10. The ball and socket connection 88—89 permits the arms 86 to be swung in a vertical direction and in a sideway direction for a purpose which will presently appear. The amount of side movement of the draft arms 86 may be controlled by means of a turnbuckle generally designated at 91 as best shown in FIGURE 8. The turnbuckle 91 comprises a screw link 92 pivotally connected as indicated at 93 to a bracket 94. The turnbuckle 91 also includes a rotatable element 95 suitably internally threaded and which engages a link 96 pivotally connected to a bracket 97 in turn secured to one of the arms 86. The turn buckle 91 is of a conventional type and upon rotation of the member 95 the arms 86 may be fixed in a plurality of off-set positions depending upon the desired off-set relation of the plow blade 27 with respect to the longitudinal centerline of the crawler tractor 10.

In the operation of the implement shown in the figures the raising and lowering of the blade 27, and implement, is identical and is affected by means of the cable control system 62 which may be controlled by the operator from the operator's station 14. In FIGURE 4 it is noted that the blade 27 is positioned in a certain angular relation. This position is for an extreme shallow operation and upon movement of the lower portion of the legs 28 in a counterclockwise direction greater depth working of the blade 27 is accomplished. In order to adjust the angularity of the legs 28 or the angular position of the plow blade the wedges 40 are simply removed or loosened which can be accomplished by simply forcing the wedges upwardly with respect to the slot 26. It can be seen that the legs 28 can then be rotated to the desired position and the lefthand wedge 40 can be placed in position whereupon the other wedge 40 is solidly driven into position against the edge 31 whereupon the structure is fixed in tight relation and the adjustment is assured. The flat faces 34 on the rollers 33 facilitate the placement of the wedges 40. Thus by suitably positioning the wedges 40 relative to the surfaces 31 and 32 the desired angularity can be achieved in a simple inexpensive and secure manner.

The implement can be quickly disassembled for shipping purposes by disconnecting the draft arms 41. Also the draft arms 41 can quickly be moved laterally relative to the beam 21 so that the blade 27 may be suitably offset as desired with respect to the longitudinal centerline of the tractor to which it may be attached. This offset arrangement may be desirable depending upon the land clearing conditions which are prevalant since it will permit the operator to view the operation. Thus by simply removing the bolts 44 and by changing the position of the arms 41 on plate 24, the blade 27 may be offset or may be positioned centrally as desired.

In FIGURES 5 and 6 adjustment of the angularity of the legs 69 and blade 27 is controlled by means of the jacks 72. In this case the operator merely actuates the control member 83 which supplies fluid under pressure to the jacks 72 which move the pistons 77 for rotating the legs 69 on the pivots 70. By noting the indicator 84 he can position the same at the proper indice indicating the depth of adjustment that he desires. Thus fluid under pressure will actuate the jacks 72 so that hydraulic actuation of the legs 69 to the desired position is quickly effected. The jacks 72 may also be moved by means of the adjustable bracket 74 in a lateral direction relative to the draft arms 41 in the event that the draft arms are positioned in such a manner for offset operation as above described. The jacks 72 of course can also be suitably connected by means of conduits to a hydraulic system (not shown), which may be an integral part of the crawler tractor and the operation will be substantially the same.

In FIGURES 7 and 8 offset operation can be achieved by actuation of the turnbuckle 95 which may position the box beam 21 in the desired positions relative to the longitudinal centerline of the tractor.

Thus it is obvious that the objects of the invention have been fully achieved and that an improved root plow has been described. It must be realized that changes and further modifications may be made without departing from the spirit of the invention as disclosed or from the scope thereof as defined in the appended claims.

What is claimed is:

1. An implement including a frame comprising a transversely extending supporting beam, a pair of substantially parallel draft arms supported on said beam and projecting laterally horizontally with respect thereto, said draft arms having pivot ends adapted to be pivotally connected to a tractor whereby said frame may be raised and lowered with respect to the ground, means adjustably connecting said draft arms to said beam whereby said draft arms may be moved laterally with respect to said beam, a pair of supporting structures connected to opposite ends of said beam, said structure each including a pair of laterally spaced upright plates connected together to form a vertically extending slot, a plow blade disposed below said beam, a pair of upright legs connected to said blade, means on said structures pivotally connecting said legs between said plates whereby said legs and blade may be secured in a plurality of earth engaging positions, each of said legs having an upper tapering edge portion and an upper substantially straight portion within said slots, adjustable means on each structure including a pair of triangular shaped wedge elements engaging said tapering edge and straight portions within said slots, and a pair of rotatable members journalled in said plates, each of said rotatable members having a flat face engaging said wedge elements to maintain the same in engagement with the upper portions of said legs.

2. An implement including a frame comprising a transversely extending supporting beam, a pair of draft arms supported on said beam and projecting laterally horizontally with respect thereto, said draft arms having pivot ends adapted to be pivotally connected to a tractor whereby said frame may be raised and lowered with respect to the ground, a pair of supporting structures connected to opposite ends of said beam, said structures each including a pair of laterally spaced upright plates connected together to form a vertically extending slot, a plow blade disposed below said beam, a pair of upright legs connected to said blade, means on said structures pivotally connecting said legs between said plates whereby said legs and blade may be secured in a plurality of earth engaging positions, each of said legs having an upper tapering edge portion and an upper substantially straight portion within said slots, adjustable means on each structure including a pair of triangular shaped wedge elements engaging said tapering edge and straight portions within said slots, and a pair of rotatable members journalled in said plates, each of said rotatable members having a flat face engaging said wedge elements to maintain the same in engagement with the upper portions of said legs.

3. An implement including a frame comprising a transversely extending supporting beam, a pair of draft arms supported on said beam and projecting laterally horizontally with respect thereto, said draft arms having pivot ends adapted to be pivotally connected to a tractor whereby said frame may be raised and lowered with respect to the ground, means adjustably connecting said draft arms to said beam whereby said draft arms may be moved laterally with respect to said beam, a pair of supporting structures connected to opposite ends of said beam, said structures each including a pair of laterally spaced upright plates connected together to form a vertically extending slot, a plow blade disposed below said beam, a pair of upright legs connected to said blade, means on said structures pivotally connecting said legs between said plates whereby said legs and blade may be secured in a plurality of earth engaging positions, each of said legs having an upper tapering edge portion and an upper substantially straight portion within said slots, adjustable means on each structure including a pair of wedge elements engaging said tapering edge and straight portions within said slots, and a pair of rotatable members journalled on said plates, each of said rotatable members having a face engaging said wedge elements to maintain the same in engagement with the upper portions of said legs.

4. An implement including a frame comprising a transversely extending supporting beam, a pair of substantially parallel draft arms supported on said beam and projecting laterally horizontally with respect thereto, said draft arms having pivot ends adapted to be pivotally connected to a tractor whereby said frame may be raised and lowered with respect to the ground, means adjustably connecting said draft arms to said beam whereby said draft arms may be moved laterally with respect to said beam, a pair of supporting structures connected to opposite ends of said beam, said structures each including a pair of laterally spaced upright plates connected together to form a vertically extending slot, a plow blade disposed below said beam, a pair of upright legs connected to said blade, means on said structures pivotally connecting said legs between said plates whereby said legs and blade may be secured in a plurality of earth engaging positions and adjustable means on each structure within said slot for locking said legs in said position.

References Cited in the file of this patent
UNITED STATES PATENTS

| | | |
|---|---|---|
| 1,303,222 | Stevens et al. | May 6, 1919 |
| 2,190,347 | Austin | Feb. 13, 1940 |
| 2,295,458 | Edwards | Sept 8, 1942 |
| 2,323,412 | Noble | July 6, 1943 |
| 2,784,508 | Risk | Mar. 12, 1957 |